US009520747B2

(12) United States Patent
Yim

(10) Patent No.: US 9,520,747 B2
(45) Date of Patent: Dec. 13, 2016

(54) TWO-INPUT UNINTERRUPTIBLE VOLTAGE CONVERTING DEVICE AND METHOD THEREOF

(75) Inventor: Frank Mau Shin Yim, Guangdong (CN)

(73) Assignees: JAGESON ELECTRONIC TECHNOLOGY (SHENZHEN) CO., LTD., Shenzhen, Guangdong (CN); Frank Mau Shin Yim, Shenzhen, Guangdong (CN)

(*) Notice: Subject to any disclaimer, the term of this patent is extended or adjusted under 35 U.S.C. 154(b) by 717 days.

(21) Appl. No.: 13/699,650

(22) PCT Filed: May 27, 2010

(86) PCT No.: PCT/CN2010/073316
§ 371 (c)(1),
(2), (4) Date: Nov. 23, 2012

(87) PCT Pub. No.: WO2011/147091
PCT Pub. Date: Dec. 1, 2011

(65) Prior Publication Data
US 2013/0062954 A1 Mar. 14, 2013

(51) Int. Cl.
H02J 1/00 (2006.01)
H02J 9/06 (2006.01)
(Continued)

(52) U.S. Cl.
CPC .............. H02J 9/061 (2013.01); H02J 9/062 (2013.01); H02M 1/10 (2013.01);
(Continued)

(58) Field of Classification Search
CPC ....................................................... H02J 9/061
(Continued)

(56) References Cited

U.S. PATENT DOCUMENTS 5,040,088 A * 8/1991 Harrington et al. ............ 361/31
5,724,235 A * 3/1998 Shimamori et al. ....... 363/21.06
(Continued)

FOREIGN PATENT DOCUMENTS

CN  02204312.8   2/2003
JP  11-254930    3/2003
JP  02134455.8   1/2004

Primary Examiner — Stephen W Jackson
(74) Attorney, Agent, or Firm — Jackson IPG PLLC; Demian K. Jackson

(57) ABSTRACT

The invention relates to a two-input uninterruptible voltage converting device and a method thereof. The device comprises a first conversion circuit, a second conversion circuit, an energy storage unit, a fly-wheel switch tube and a control unit. The method comprises the following steps of: converting a PWM signal outputted by a pulse width modulator into first, second, third and fourth PWM signals in phase via a pulse transformer; driving the first conversion circuit and the second conversion circuit respectively to operate synchronously; converting a high voltage DC (Direct Current) and a low voltage DC into two pulse voltages in phase to adaptively perform mutual energy compensation via an intersection; and supplying a load with an uninterruptible stable voltage via the back-end energy storage unit and free-wheel circuit. The two-input uninterruptible voltage converting device has the advantages of high circuit conversion efficiency, high reliability and low power consumption.

12 Claims, 4 Drawing Sheets

(51) Int. Cl.
*H02M 1/10* (2006.01)
*H02M 3/335* (2006.01)

(52) U.S. Cl.
CPC ..... *H02M 3/33592* (2013.01); *Y02B 70/1475* (2013.01); *Y10T 307/675* (2015.04)

(58) Field of Classification Search
USPC .......................................................... 307/75
See application file for complete search history.

(56) References Cited

U.S. PATENT DOCUMENTS 5,909,360 A    6/1999   Lavin et al.
6,169,675 B1 *   1/2001   Shimamori et al. ............ 363/70

* cited by examiner

TWO-INPUT UNINTERRUPTIBLE VOLTAGE CONVERTING DEVICE AND METHOD THEREOF

FIELD OF THE INVENTION

The invention relates to the voltage conversion technology, in particular to a two-input uninterruptible voltage converting device and a method thereof.

BACKGROUND OF THE INVENTION

Energy saving is the most important policy for industries in the whole world. With the development of the IT industry, the energy consumed by the application of IT equipment occupies higher and higher proportion in energy consumption. In order to guarantee the reliable and uninterruptible operation of information equipment (such as IDCs (Internet Data Center), banks, insurance, stock markets, wireless communication base stations, repeaters, various EPON devices, security equipment and fire monitoring systems), a plurality of UPSes (Uninterruptible Power Source) are connected between sensitive equipment and a power supply network in series. In a series system formed by the power supply network, the UPSes and the sensitive equipment (load), the UPSes must be subjected to main energy conversion twice completely in order to avoid the 1% power-off possibility of the sensitive equipment.

If the reliability of the electric network is L %, the reliability of the UPSes being U %, and the total power supply reliability of the system being P %, P %=U %, which means that the safe power supply of the system can only be guaranteed when the UPSes are normal.

Therefore, if the "function utilization" of the UPSes is F %, $$F\%=(1-L\%)-(1-U\%)=U\%-L\%.$$

The formula of the "total resources utilization" is as follows:

> Total Resources Utilization=Function Utilization×
> (Purchasing Cost×Annual Depreciation Rate+
> Annual Energy Consumption Cost+Maintenance
> Cost)

It can be easily seen that the "resources utilization" of the UPSes is the minimum among all the power conversion devices.

Moreover, an AC passes through the UPSes and SMPSes (Switch Mode Power Supply) of the equipment and arrives at ultimate loads of the equipment. Due to the efficiency of the UPSes of less than 100% and the no-load standby power consumption, energy of 3% or higher may be consumed.

As the traditional UPS power supply protection mode has the inherent defects, a 240 Vdc power supply proposal, a 48 Vdc power supply proposal and certain AC/DC–DC/DC proposals have been adopted in the telecommunication industry, IDC machine rooms and the like currently. However, in all the methods, one energy conversion unit must be connected in series on the front of the sensitive equipment, and then the methods also have the defects of energy consumption and resource waste.

The Chinese invention patent No. ZL021344558 discloses a self-coupling mutual inductance uninterruptible switching power supply, wherein the core technology thereof is to introduce a second energy low-voltage DC and find out an optimal entry point according to the turn ratio of primary and secondary windings. However, there is 1% to 3% energy loss in low-voltage DC circuits during the high-voltage operation.

SUMMARY OF THE INVENTION

The objective of the invention is to provide a simpler two-input online uninterruptible switch-type voltage converting device and a method thereof, so that the automatic power-off protection can be reliably provided for sensitive equipment and the energy loss of a low-voltage DC (Direct Current) during the normal operation of a high-voltage DC can be avoided.

In order to achieve the objective, the invention adopts the reverse thinking of the traditional power supply protection means, searches for an optimal solution at a position most close to an ultimate load required for protection, and adopts a line topology more close to a terminal to solve the power-off protection. The specific technical proposal of the invention is that:

The invention relates to a two-input uninterruptible voltage converting device, which comprises:

a first conversion circuit, in which the first conversion circuit has a high-voltage DC (Direct Current) source, a main power transformer, an upper switch tube and a lower switch tube connected to a primary winding of the main power transformer, and a switch-type rectifying tube connected to a secondary winding of the main power transformer; and an output end of the switch-type rectifying tube is taken as an intersection;

a second conversion circuit, in which the second conversion circuit is formed by a low-voltage DC source, an isolating diode and a low-voltage switch tube connected with each other in turn; an output end of the second conversion circuit is connected to the intersection; the minimum allowable voltage of the low-voltage DC source is more than the rated output voltage of the device; and the maximum voltage of the low-voltage DC source is less than the voltage peak of the secondary winding of the main power transformer when the high-voltage DC is the minimum allowable value;

an energy storage unit, in which the energy storage unit consists of an inductance and a capacitance and is directly connected between the intersection and a load end;

a fly-wheel switch tube, in which the fly-wheel switch tube is connected between the intersection and the ground; and a control unit, in which the control unit is used for outputting first, second, third and fourth PWM (Pulse-Width Modulation) signals in phase to drive the upper switch tube, the lower switch tube, the switch-type rectifying tube and the low-voltage switch tube respectively to operate synchronously and outputting a fifth PWM signal in mutual opposite phase compensation with the first PWM signal to drive the fly-wheel switch tube to operate.

Wherein, the switch-type rectifying tube is an MOSFET preferably. The MOSFET can be driven by the third PWM signal outputted by the control unit to operate synchronously with the upper and lower switch tubes and can also be driven by a bootstrap winding of the main power transformer to operate synchronously with the upper and lower switch tubes. The switch-type rectifying tube can also adopt a Schottky diode and the like.

The invention provides a two-input uninterruptible voltage converting method, which comprises the following steps of:

converting the PWM signal outputted by the pulse width modulator into the first, second, third and fourth PWM signals in phase via the pulse transformer; driving the upper switch tube and the lower switch tube on the primary side of the main power transformer in the first conversion circuit, the switch-type rectifying tube on the secondary side, and the low-voltage switch tube in the second conversion circuit respectively to operate synchronously; converting a high-voltage DC and a low-voltage DC into two pulse voltages in phase; adaptively selecting one pulse voltage to supply the back-end energy storage unit with a current after the intersection of the output end of the switch-type rectifying tube;

allowing the pulse transformer to output the fifth PWM signal in opposite phase and mutual pulse width compensation with the first PWM signal simultaneously to drive the fly-wheel switch tube to operate; supplying a fly-wheel channel for a BEMF (Back Electromotive Force) on an inductance in the energy storage unit during the shutdown of the upper switch tube, the lower switch tube and the low-voltage switch tube; and allowing the central control unit to sample the voltage at the load end and control the pulse width of the PWM signal outputted by the pulse width modulator after analysis and determination, so that the DC voltage outputted by the load end can be kept stable.

The two-input uninterruptible voltage converting method converts the high-voltage DC and the low-voltage DC into the two pulse voltages in phase, adaptively selects one pulse voltage with larger pulse amplitude to supply the load with power via the back-end energy storage unit and fly-wheel circuit after the direct intersection, does not need to exactly design the number of turns of the main power transformer to determine an entry point of the low-voltage DC, and can achieve the function of uninterruptible power supply via the online mutual compensation of the high-voltage DC and the low-voltage DC without detecting the state of the high-voltage DC.

As a high-voltage source and a low-voltage source are connected with each other in series and connected with the back-end energy storage unit and supply the back-end energy storage unit with power uninterruptibly via mutual compensation, the two-input uninterruptible voltage converting device can provide more reliable power-off protection for the sensitive equipment compared with the traditional method for connecting UPSes (Uninterruptible Power Source) in series between the sensitive equipment and a power supply network.

Moreover, there is no current in the second conversion circuit and no energy loss on the low-voltage DC source during the normal power supply of the high-voltage DC. In addition, the synchronous rectification technology is further adopted. Therefore, the energy can be effectively saved, which meets the current situation of energy saving and emission reduction.

Furthermore, the device has the advantages of simple circuits, high conversion efficiency, high reliability and low energy consumption, can be widely applied to various kinds of power supply sensitive equipment in the case of AC (Alternating Current)/DC or DC/DC power supply, for example, communication equipment, rail traffic monitoring systems, security systems, IDC (Internet Data Center) equipment, solar energy and AC two-input LED lighting systems and military dual-energy systems.

DETAILED DESCRIPTION OF THE PREFERRED EMBODIMENTS

Further description is given to the invention with the attached drawings and embodiments.

Embodiment 1

Figure 1:
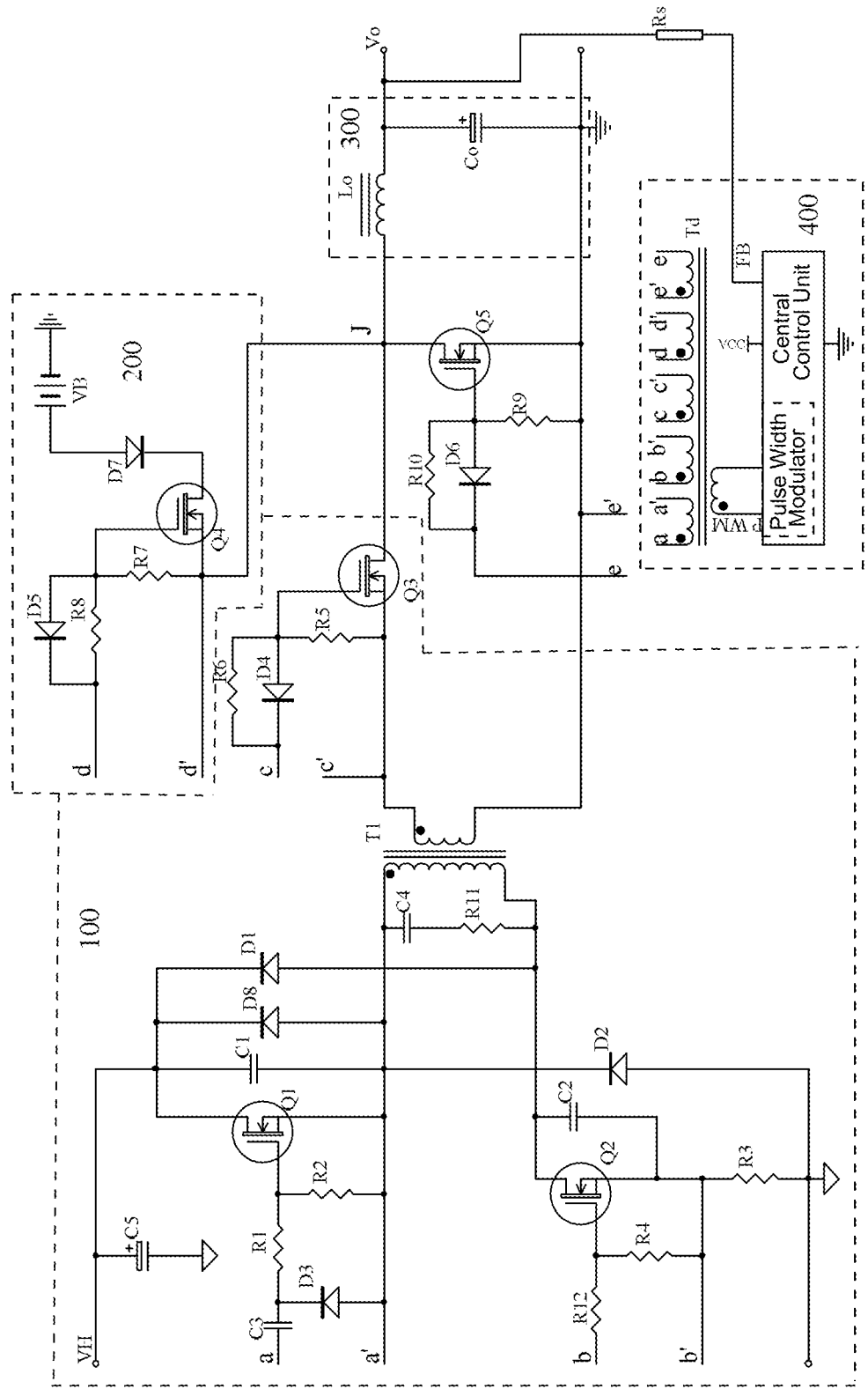
FIG. 1 is a schematic diagram of an embodiment 1.

As illustrated in FIG. 1, the two-input uninterruptible voltage converting device comprises a first conversion circuit 100, a second conversion circuit 200, an energy storage unit 300 and a control unit 400.

The first conversion circuit 100 has a high-voltage DC (Direct Current) source VH, a main power transformer T1, an upper switch tube Q1 and a lower switch tube Q2 connected to a primary winding of the main power transformer T1, and a switch-type rectifying tube Q3 connected to a secondary winding of the main power transformer T1; and an output end of the switch-type rectifying tube Q3 is taken as an intersection J.

The second conversion circuit 200 is formed by a low-voltage DC source VB, an isolating diode D7 and a low-voltage switch tube Q4 connected with each other in series in turn; an output end of the second conversion circuit 200 is connected to the intersection J; the minimum allowable voltage of the low-voltage DC source VB is more than the rated output voltage of the device; and the maximum voltage of the low-voltage DC source VB is less than the voltage peak of the secondary winding of the main power transformer T1 when the high-voltage DC is the minimum allowable value.

The energy storage unit 300 consists of an induction Lo and a capacitance Co and is directly connected between the intersection J and a load end.

A fly-wheel switch tube Q5 is connected between the intersection J and the ground.

The control unit 400 has a central control unit, a pulse width modulator and a pulse transformer Td, wherein the pulse width modulator is integrated into the central control unit; an output end of the pulse width modulator is connected with a primary winding of the pulse transformer Td; and secondary windings aa', bb', cc', dd' and e'e of the pulse transformer Td are respectively connected with the upper switch tube Q1, the switch tube Q2, the switch-type rectifying tube Q3, the low-voltage switch tube Q4 and the fly-wheel switch tube Q5. After a PWM (Pulse-Width Modulation) signal outputted by the pulse width modulator is isolated and converted by the pulse transformer Td, the upper switch tube Q1, the lower switch tube Q2, the switch-type rectifying tube Q3 and the low-voltage switch tube Q4 are driven to operate synchronously by first, second, third and fourth PWM signals in phase outputted from the secondary windings aa', bb', cc', dd' and e'e respectively, and the fly-wheel switch tube Q5 is driven to operate by a fifth PWM signal, which is outputted from the secondary winding e'e and in opposite phase with the first PWM signal. Moreover, the pulse width modulator can also adopt an independent device independent of the central control unit.

The upper switch tube Q1, the lower switch tube Q2 and the switch-type rectifying tube Q3 in the first conversion circuit 100 all adopt an MOSFET, and the fly-wheel switch tube Q5 and the low-voltage switch tube Q4 in the second conversion circuit 200 also adopt an MOSFET.

The upper end of the primary winding of the main power transformer T1 is connected with a source electrode of the upper switch tube Q1 and the lower end is connected with a drain electrode of the lower switch tube Q2; a drain electrode of the upper switch tube Q1 is connected with a positive electrode of the high-voltage DC source VH; a source electrode of the lower switch tube Q2 is connected with a negative electrode of the high-voltage DC source VH; a first capacitance C1 is connected between the source electrode and the drain electrode of the upper switch tube Q1; and a second capacitance C1 is connected between the source electrode and the drain electrode of the lower switch tube Q2.

The load end Vo of the device is connected to a sampling input end of the central control unit via a sampling resistance Rs. The central control unit controls the pulse width of a PWM signal outputted by the pulse width modulator via the analysis and determination of a voltage sampling signal, so that the output end Vo of the device is guaranteed to output a stable DC voltage. The central control unit can also be used for receiving a protective actuating signal and a remote monitoring signal accessed by an output grouped monitoring protection function unit, a voltage sampling signal of the low-voltage DC source VB, a voltage sampling signal of the high-voltage DC source VH, and the like, and can be used for controlling the on/off of the device. Moreover, the central control unit can be operated on both the high-voltage side and the low-voltage side of the main power transformer T1.

The voltage converting method of the two-input uninterruptible voltage converting device comprises the following steps of:

converting the PWM signal outputted by the pulse width modulator into the first, second, third and fourth PWM signals in phase via the pulse transformer Td; driving the upper switch tube Q1 and the lower switch tube Q2 on the primary side of the main power transformer T1 in the first conversion circuit 100, the switch-type rectifying tube Q3 on the secondary side, and the low-voltage switch tube Q4 in the second conversion circuit 200 respectively to operate synchronously; converting a high-voltage DC and a low-voltage DC into two pulse voltages in phase; adaptively selecting one pulse voltage with larger pulse amplitude to supply the back-end energy storage unit 300 with a current after the intersection of the output end (namely the intersection J) of the switch-type rectifying tube Q3;

allowing the secondary winding e'e of the pulse transformer Td to output the fifth PWM signal in opposite phase and mutual pulse width compensation with the first PWM signal simultaneously to drive a fly-wheel switch tube Q5 to operate; supplying a fly-wheel channel for a BEMF (Back Electromotive Force) on an inductance Lo in the energy storage unit 300 during the shutdown of the upper switch tube Q1, the lower switch tube Q2 and the low-voltage switch tube Q4; and allowing the central control unit to sample the voltage at the load end Vo, control the pulse width of the PWM signal outputted by the pulse width modulator after analysis and determination, and further control the on time of the upper switch tube Q1, the lower switch tube Q2, the switch-type rectifying tube Q3 and the low-voltage switch tube Q4, so that the DC voltage outputted by the load end Vo can be kept stable.

The second conversion circuit 200 simultaneously supplies the switch-type rectifying tube Q3 with energy when supplying the back-end energy storage unit 300 with electrical energy. The energy is subjected to backcoupling of the main power transformer T1 and rectification of diodes D1 and D8 in turn to generate a non-voltage-regulation high-frequency voltage and form a DC high voltage on a capacitance C5 of a high-voltage bus, so that the energy can be supplied for a load which operates under high voltage.

Embodiment 2

Figure 2:
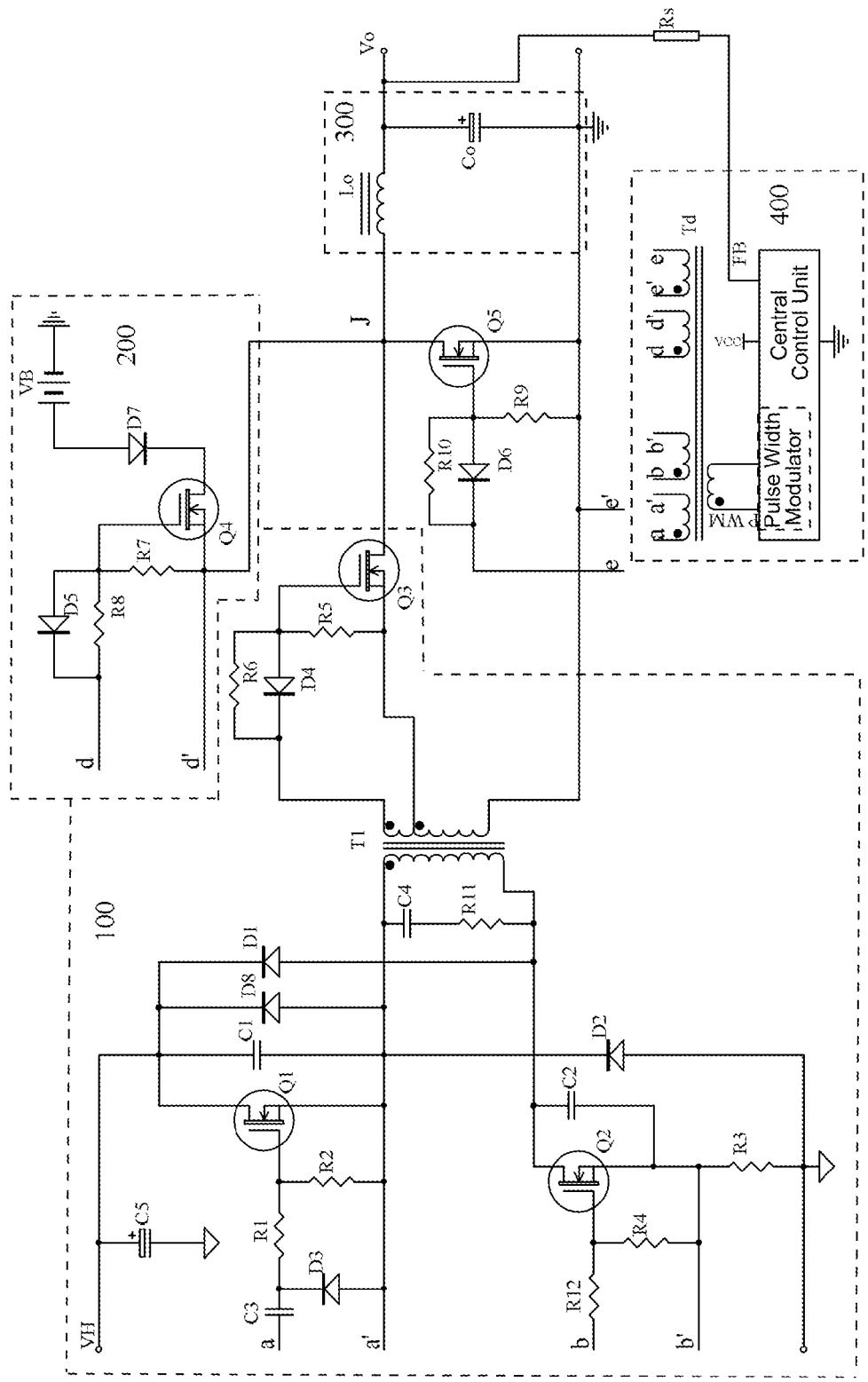
FIG. 2 is a schematic diagram of an embodiment 2.

As illustrated in FIG. 2, the two-input uninterruptible voltage converting device of the embodiment 2 is basically the same with that of the embodiment 1, with the difference as follows: in the embodiment 1, the switch-type rectifying tube Q3 is driven by the secondary winding cc' of the pulse transformer Td and synchronously switched on or off with the upper switch tube Q1, the lower switch tube Q2 and the low-voltage switch tube Q4.

But in the embodiment 2, the switch-type rectifying tube Q3 adopts the bootstrap driving means, namely the switch-type rectifying tube Q3 is driven by a pulse voltage outputted by another secondary winding (namely a bootstrap winding) of the main power transformer T1 and synchronously switched on or off with the upper switch tube Q1, the lower switch tube Q2 and the low-voltage switch tube Q4. In actual application, the amplitude of the pulse voltage generated by the bootstrap winding must be controlled to be within the range specified by a gate of the MOSFET.

Embodiment 3

Figure 3:
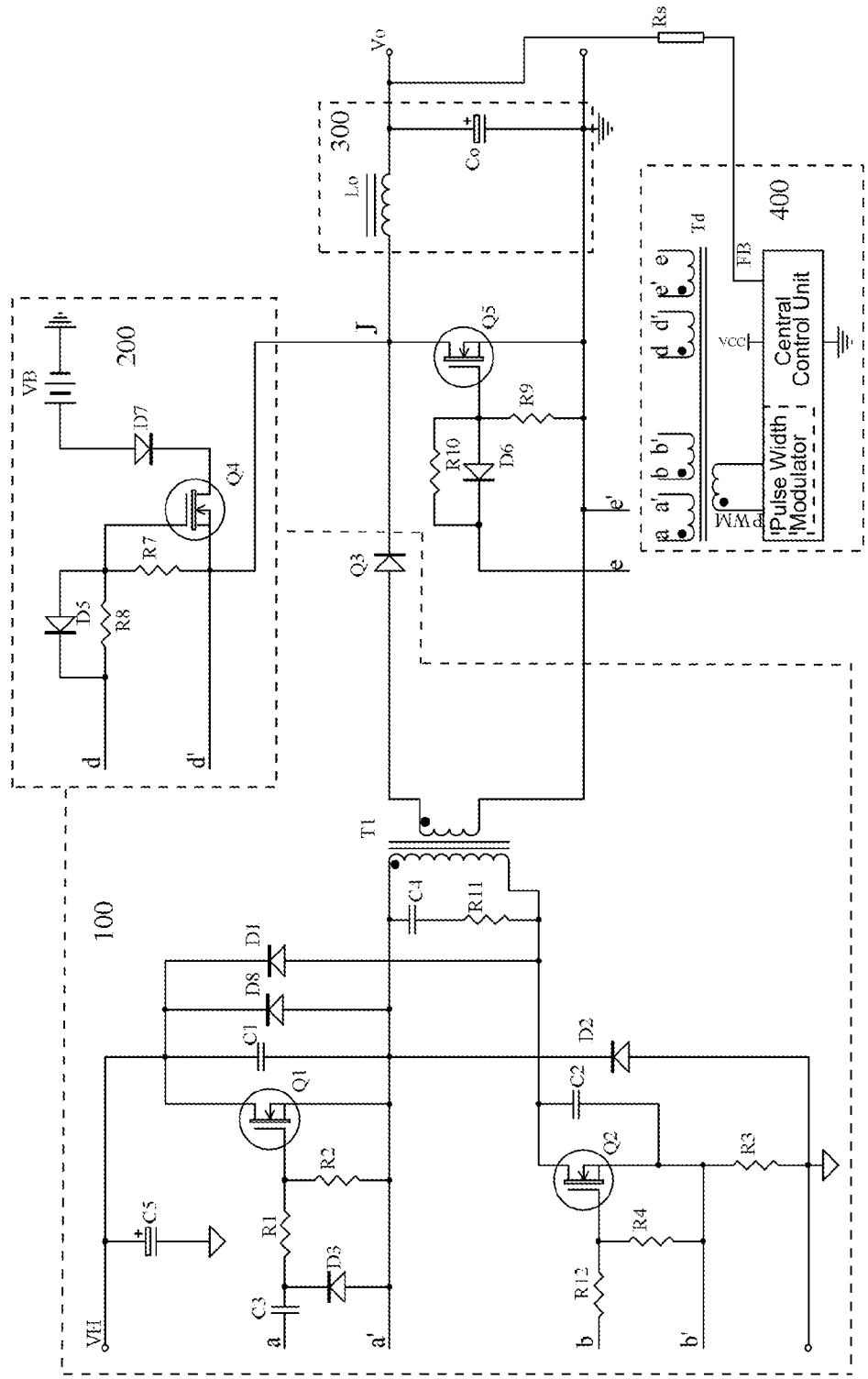
FIG. 3 is a schematic diagram of an embodiment 3.

As illustrated in FIG. 3, the two-input uninterruptible voltage converting device of the embodiment 3 is basically the same with that of the embodiment 1, with the difference as follows: in the embodiment 1, the switch-type rectifying tube Q3 adopts an MOSFET and is synchronously switched on or off with the upper switch tube Q1 and the lower switch tube Q2, namely adopting the synchronous rectification technology. But in the embodiment 3, the rectifying tube Q3 adopts a Schottky diode (SBD), so that the two-input uninterruptible voltage converting device of the embodiment 3 has the advantages of simpler lines and lower cost. The embodiment 3 is adapted to the case of low power and no need of inverse high-voltage output.

Embodiment 4

Figure 4:
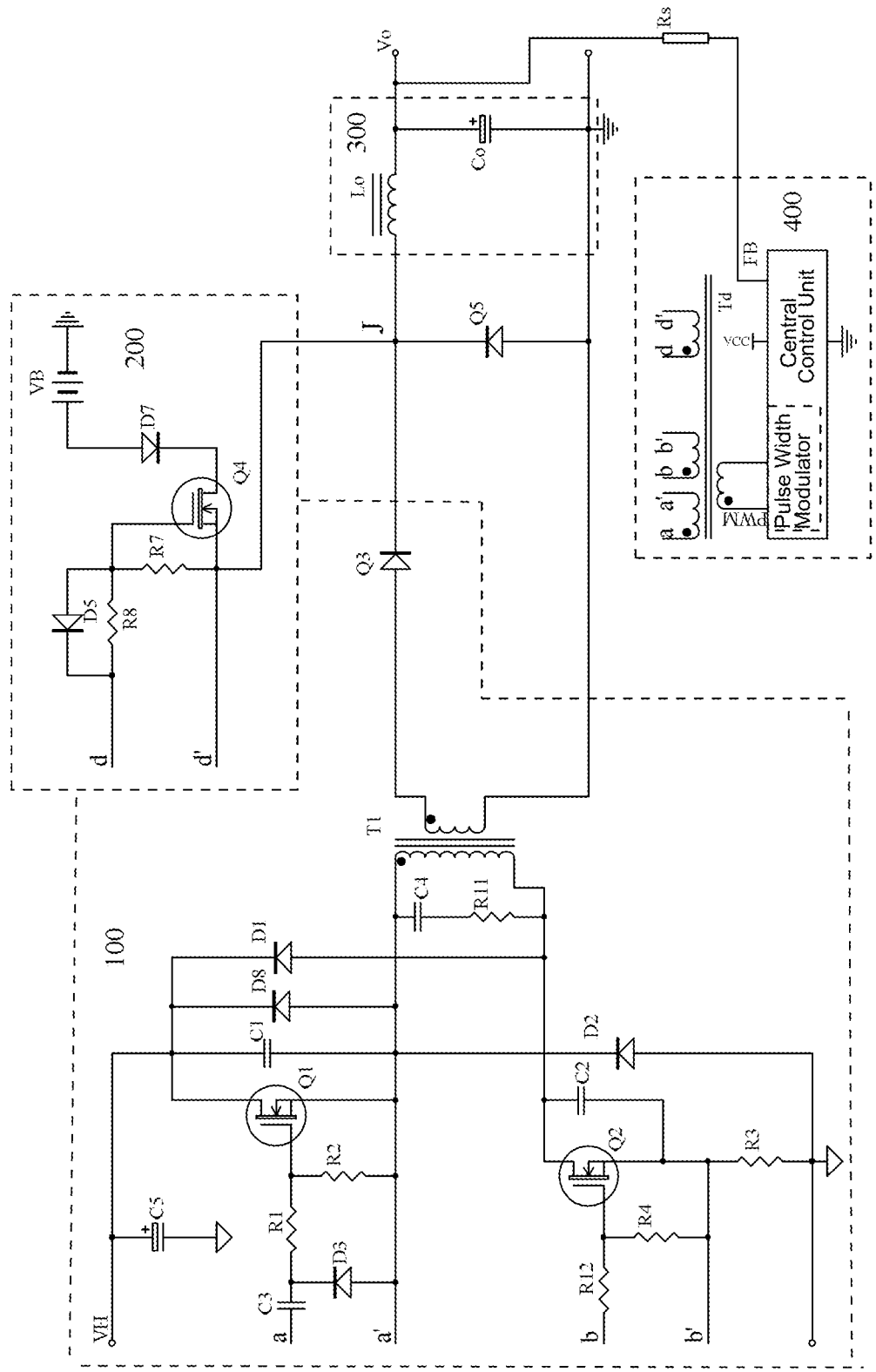
FIG. 4 is a schematic diagram of an embodiment 4.

As illustrated in FIG. 4, the two-input uninterruptible voltage converting device of the embodiment 4 is basically the same with that of the embodiment 3, with the difference as follows: in the embodiment 3, the fly-wheel switch tube Q5 adopts an MOSFET and is driven to operate by the secondary winding e'e of the pulse transformer Td. But in the embodiment 4, the fly-wheel switch tube Q5 adopts a Schottky diode, so that the objectives of simplifying the lines, saving the cost and improving the reliability can be achieved. The embodiment 4 is adapted to the case of low power.

What is claimed is:

1. A two-input uninterruptible voltage converting device, comprising:
a first conversion circuit, in which the first conversion circuit having a high-voltage DC (Direct Current) source, a main power transformer, an upper switch tube and a lower switch tube connected to a primary winding of the main power transformer, and a switch-type rectifying tube connected to a secondary winding of the main power transformer; and an output end of the switch-type rectifying tube taken as an intersection;

a second conversion circuit, in which the second conversion circuit formed by a low-voltage DC source, an isolating diode and a low-voltage switch tube connected with each other in series in turn; an output end of the second conversion circuit connected to the intersection; the minimum allowable voltage of the low-voltage DC source being more than the rated output voltage of the device; and the maximum voltage of the low-voltage DC source being less than the voltage peak of the secondary winding of the main power transformer when the high-voltage DC is the minimum allowable value;

an energy storage unit, in which the energy storage unit consisting of an inductance and a capacitance and directly connected between the intersection and a load end;

a fly-wheel switch tube, in which the fly-wheel switch tube connected between the intersection and the ground; and a control unit, in which the control unit used for outputting first, second, third and fourth PWM (Pulse-Width Modulation) signals in phase to drive the upper switch tube, the lower switch tube, the switch-type rectifying tube and the low-voltage switch tube respectively to operate synchronously and outputting a fifth PWM signal in opposite phase with the first PWM signal to drive the fly-wheel switch tube to operate.

2. The device according to claim 1, wherein the switch-type rectifying tube in the first conversion circuit is an MOSFET and is driven by the third PWM signal outputted by the control unit to operate synchronously with the upper and lower switch tubes.

3. The device according to claim 2, wherein the control unit has a central control unit, a pulse width modulator and a pulse transformer; and a PWM signal outputted by the pulse width modulator is converted into the first, second, third, fourth and fifth PWM signals via the isolation of the pulse transformer.

4. The device according to claim 1, wherein the switch-type rectifying tube in the first conversion circuit is an MOSFET and is driven by a bootstrap winding of the main power transformer to operate synchronously with the upper and lower switch tubes.

5. The device according to claim 4, wherein the control unit has a central control unit, a pulse width modulator and a pulse transformer; and a PWM signal outputted by the pulse width modulator is converted into the first, second, fourth and fifth PWM signals via the isolation of the pulse transformer.

6. The device according to claim 2, wherein the upper end of the primary winding of the main power transformer in the first conversion circuit is connected with a source electrode of the upper switch tube and the lower end is connected with a drain electrode of the lower switch tube; a drain electrode of the upper switch tube is connected with a positive electrode of the high-voltage DC source; a source electrode of the lower switch tube is connected with a negative electrode of the high-voltage DC source; a first capacitance is connected between the source electrode and the drain electrode of the upper switch tube; and a second capacitance is connected between the source electrode and the drain electrode of the lower switch tube.

7. The device according to claim 1, wherein the switch-type rectifying tube in the first conversion circuit adopts a Schottky diode.

8. The device according to claim 7, wherein the upper end of the primary winding of the main power transformer in the first conversion circuit is connected with the source electrode of the upper switch tube and the lower end is connected with the drain electrode of the lower switch tube; the drain electrode of the upper switch tube is connected with the positive electrode of the high-voltage DC source; the source electrode of the lower switch tube is connected with the negative electrode of the high-voltage DC source; the first capacitance is connected between the source electrode and the drain electrode of the upper switch tube; and the second capacitance is connected between the source electrode and the drain electrode of the lower switch tube.

9. The device according to claim 1, wherein the fly-wheel switch tube is a Schottky diode or an MOSFET.

10. The device according to claim 1, wherein the fly-wheel switch is a Schottky diode; and the switch-type rectifying tube in the first conversion circuit is another Schottky diode.

11. A two-input uninterruptible voltage converting method, comprising the following steps of:
converting a PWM signal outputted by a pulse width modulator into a first, second, third and fourth PWM signals in phase via a pulse transformer; driving an upper switch tube and a lower switch tube on a primary side of a main power transformer in a first conversion circuit, a switch-type rectifying tube on a secondary side, and a low-voltage switch tube in a second conversion circuit respectively to operate synchronously; converting a high-voltage DC and a low-voltage DC into two pulse voltages in phase; adaptively selecting one pulse voltage to supply a back-end energy storage unit with a current after the intersection of an output end of the switch-type rectifying tube;

allowing a pulse transformer to output a fifth PWM signal in opposite phase and mutual pulse width compensation with the first PWM signal simultaneously to drive a fly-wheel switch tube to operate; supplying a fly-wheel channel for a BEMF (Back Electromotive Force) on an inductance in the energy storage unit during the shutdown of the upper switch tube, the lower switch tube and a low-voltage switch tube; and allowing a central control unit to sample a voltage at a load end and control the pulse width of the PWM signal outputted by the pulse width modulator after analysis and determination, so that the DC voltage outputted by the load end can be kept stable.

12. The method according to claim 11, wherein the second conversion circuit simultaneously supplies the switch-type rectifying tube with energy when supplying the back-end energy storage unit with electrical energy; the energy is subjected to backcoupling of the main power transformer and rectification of diodes in turn to generate a non-voltage-regulation high-frequency voltage and form a DC high voltage on a capacitance of a high-voltage bus, so that the energy can be supplied for a load which operates under high voltage.

* * * * *